US009488885B2

(12) United States Patent
Chang et al.

(10) Patent No.: US 9,488,885 B2
(45) Date of Patent: Nov. 8, 2016

(54) DISPLAY APPARATUS

(71) Applicant: Samsung Display Co., Ltd., Yongin, Gyeonggi-Do (KR)

(72) Inventors: Haksun Chang, Yongin-si (KR); Cheol Shin, Hwaseong-si (KR); Jang Wi Ryu, Seoul (KR); Jae-Soo Jang, Suwon-si (KR); Kichul Shin, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 44 days.

(21) Appl. No.: 14/231,067

(22) Filed: Mar. 31, 2014

(65) Prior Publication Data
US 2015/0098053 A1   Apr. 9, 2015

(30) Foreign Application Priority Data
Oct. 8, 2013   (KR) .................... 10-2013-0119990

(51) Int. Cl.
*G02F 1/1343*   (2006.01)
*G02F 1/1337*   (2006.01)

(52) U.S. Cl.
CPC ..... *G02F 1/13439* (2013.01); *G02F 1/133707* (2013.01); *G02F 2001/134372* (2013.01)

(58) Field of Classification Search
CPC ............ G02F 1/134336; G02F 2001/134345; G02F 1/136286; G02F 1/134309; G02F 1/1343; G09G 3/3659
USPC ....... 349/139, 48, 38, 42, 43; 345/90, 92, 93
See application file for complete search history.

(56) References Cited

U.S. PATENT DOCUMENTS

| | | | |
|---|---|---|---|
| 6,583,837 B1 | 6/2003 | Fukumoto et al. | |
| 6,738,120 B1 * | 5/2004 | Song ................ | G02F 1/133707 349/110 |
| 6,839,112 B2 | 1/2005 | Chien et al. | |
| 7,336,331 B2 | 2/2008 | Wu et al. | |
| 7,379,143 B2 | 5/2008 | Lyu | |
| 7,405,790 B2 | 7/2008 | Shih et al. | |
| 7,876,407 B2 | 1/2011 | Koma et al. | |
| 7,940,358 B2 | 5/2011 | Jin et al. | |
| 2004/0207790 A1 * | 10/2004 | Song et al. .................. | 349/139 |
| 2010/0231819 A1 * | 9/2010 | Lee et al. .................. | 349/43 |
| 2012/0033170 A1 * | 2/2012 | Kim et al. .................. | 349/139 |
| 2012/0236245 A1 * | 9/2012 | Jung .................. | G02F 1/1343 349/144 |
| 2013/0033668 A1 | 2/2013 | Yao et al. | |

FOREIGN PATENT DOCUMENTS

JP   2011-197112 A   10/2011

* cited by examiner

*Primary Examiner* — Thanh-Nhan P Nguyen
(74) *Attorney, Agent, or Firm* — Innovation Counsel LLP

(57) ABSTRACT

A display apparatus includes a first substrate including a pixel electrode including a first pattern inclined at first and second angles with respect to a center line and a second substrate including a common electrode including a second pattern alternately arranged with the first pattern. The first angle is about +35 degrees to about +45 degrees and the second angle is about −35 degrees to about −45 degrees.

9 Claims, 10 Drawing Sheets

DISPLAY APPARATUS

CROSS-REFERENCE TO RELATED APPLICATION

This U.S. non-provisional patent application claims priority under 35 U.S.C. §119 of Korean Patent Application No. 10-2013-0119990, filed on Oct. 8, 2013, the contents of which are hereby incorporated by reference in its entirety.

BACKGROUND

1. Field of Disclosure

The present disclosure relates to a display apparatus. More particularly, the present disclosure relates to a display apparatus having improved visibility.

2. Description of the Related Art

A liquid crystal display includes two transparent substrates and a liquid crystal layer disposed between the two transparent substrates. The liquid crystal display drives liquid crystal molecules of the liquid crystal layer to control a light transmittance in each pixel, thereby displaying a desired image.

In a vertical alignment (VA) mode liquid crystal display among various operation modes of the liquid crystal display, the liquid crystal molecules of the liquid crystal layer are vertically aligned with respect to the two substrates when an electric field is formed between the two substrates, and the vertically aligned liquid crystal molecules transmit the light, to thereby display the image. In particular, a patterned vertical alignment (PVA) mode liquid crystal display aligns the liquid crystal molecules in different directions using a patterned pixel electrode to form liquid crystal domains, and thus a viewing angle of the PVA mode liquid crystal display is improved. The pixel electrode is patterned to have micro-slits, and the liquid crystal molecules are driven by a fringe field formed between the micro-slits.

SUMMARY

The present disclosure provides a display apparatus capable of improving visibility, display quality, and aperture ratio thereof.

Embodiments of the inventive concept provide a display apparatus including a first substrate including a pixel area, a second substrate facing the first substrate, and a liquid crystal layer interposed between the first substrate and the second substrate.

The first substrate includes a data line extending in a first direction, a gate line extending in a second direction crossing the first direction, and a pixel electrode. The pixel electrode includes a first pattern inclined at first and second angles with respect to a center line. The center line extends in the first direction and passes through a center portion of the pixel area.

The second substrate includes a common electrode including a second pattern alternately arranged with the first pattern and inclined at the first and second angles with respect to the center line. The first angle is about +35 degrees to about +45 degrees and the second angle is about −35 degrees to about −45 degrees.

The first pattern is bent with reference to the center line and further includes a first sub-pattern extending in the first direction at the bent portion thereof.

The second pattern is bent with reference to the center line and further includes a second sub-pattern extending in the first direction at the bent portion thereof. The second pattern further includes a third sub-pattern extending in an opposite direction to the second sub-pattern at both ends of the second pattern, and the both ends of the second pattern are spaced apart from the center.

Each of the first and second patterns has a width of about 8 micrometers to about 12 micrometers.

The first and second patterns may be openings respectively formed by partially removing the pixel electrode and the common electrode. According to an embodiment, the first and second patterns may protrude from the pixel electrode and the common electrode, respectively. Each of the pixel electrode and the common electrode is a transparent electrode.

The display apparatus further includes a thin film transistor connected to the data line, the gate line, and the pixel electrode.

A length in the first direction of the pixel area is longer than a length in the second direction of the pixel area.

According to the above, the display apparatus may improve the visibility and aperture ratio of the pixel, and thus the display quality of the display apparatus may be improved.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
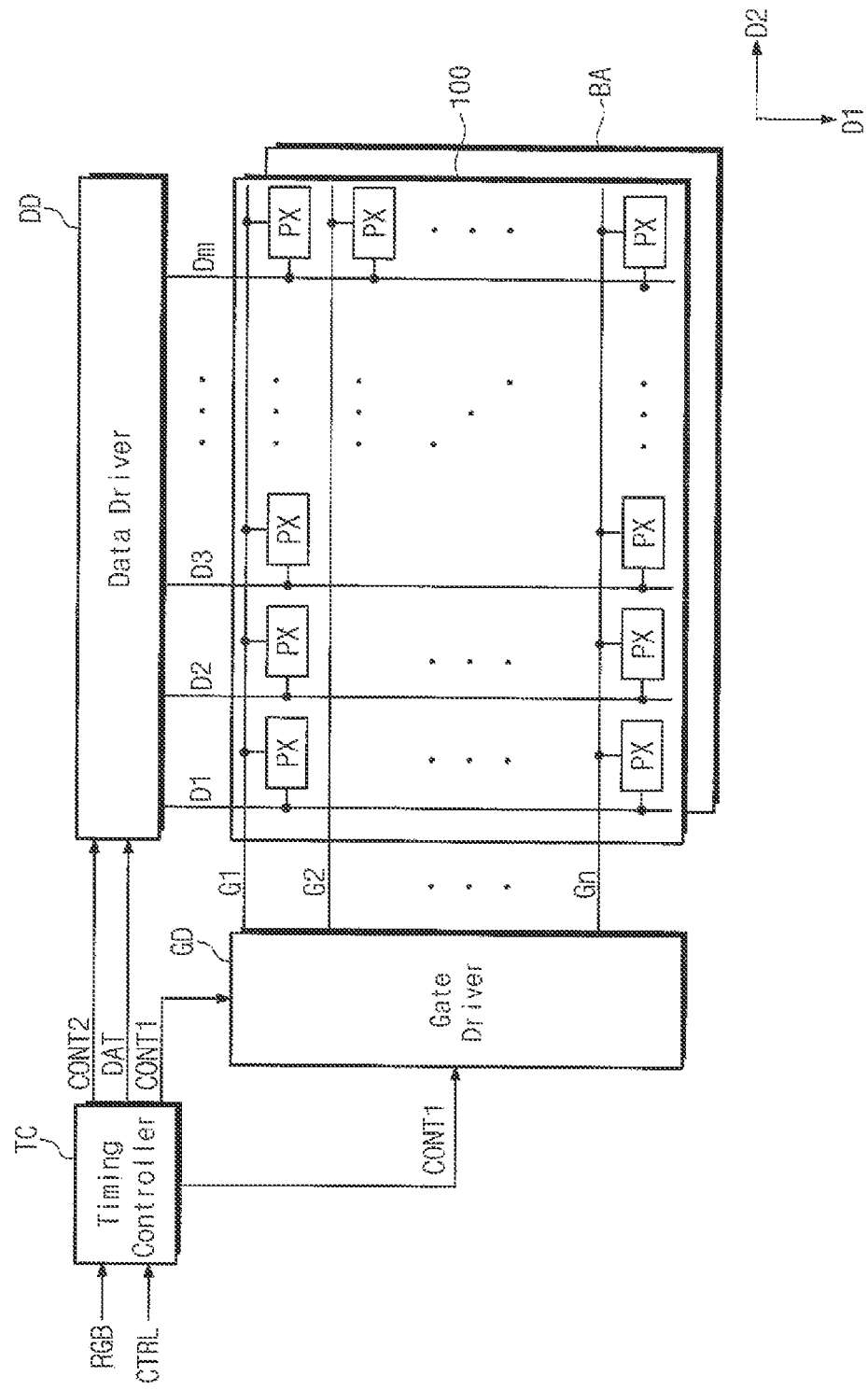
FIG. 1 is a block diagram showing a display apparatus according to an exemplary embodiment of the present disclosure.

It will be understood that when an element or layer is referred to as being "on", "connected to" or "coupled to"

another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the embodiments. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this application belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments will be explained in detail with reference to the accompanying drawings.

FIG. 1 is a block diagram showing a display apparatus according to an exemplary embodiment of the present disclosure.

Referring to FIG. 1, the display apparatus includes a display panel 100 and a driving part.

The display panel 100 includes a plurality of gate lines G1 to Gn, a plurality of data lines D1 to Dm crossing the gate lines G1 to Gn, and a plurality of pixels PX connected to the gate lines G1 to Gn and the data lines D1 to Dm.

The data lines D1 to Dm extend in a first direction D1 and are arranged substantially in parallel to each other. The gate lines G1 to Gn extend in a second direction D2 crossing the first direction D1 and are arranged substantially in parallel to each other.

Each pixel PX is connected to a corresponding gate line of the gate lines G1 to Gn and a corresponding data line of the data lines D1 to Dm to display an image.

The display panel 100 controls a light provided from a backlight assembly BA in response to a signal applied from the driving part to display the image.

The driving part includes a timing controller TC, a gate driver GD, and a data driver DD.

The data driver DD is connected to the data lines D1 to Dm of the display panel 100 and applies a data voltage corresponding to an image signal to the pixels PX.

The gate driver GD and the data driver DD are directly mounted on the display panel 100 in a driving integrated circuit chip form, or attached to the display panel 100 in a tape carrier package form after being mounted on a flexible printed circuit film. In addition, the gate driver GD and the data driver DD may be directly integrated on the display panel 100.

The timing controller TC receives image signals R, G, and B and control signals CS, such as a vertical synchronizing signal, a horizontal synchronizing signal, a clock signal, a data enable signal, etc., to control the image signals R, G, and B. The timing controller TC applies data signals DAT obtained by processing the image signals R, G, and B by taking an operation condition of the display panel 100 into consideration and a second control signal CONT2 to the data driver DD and applies a first control signal CONT1 to the gate driver GD. The second control signal CONT2 includes a clock signal, a polarity inversion signal, and a line latch signal, and the first control signal CONT1 includes a vertical synchronization start signal, an output enable signal, and a gate pulse signal.

The data driver DD receives the data signals DAT for the pixels PX in each row and applies data voltages corresponding to the data signals DAT to the data lines D1 to Dm in response to the second control signal CONT2 from the timing controller TC.

The gate driver GD applies a gate-on voltage to the gate lines G1 to Gn in response to the first control signal CONT1 from the timing controller TC.

Figure 2:
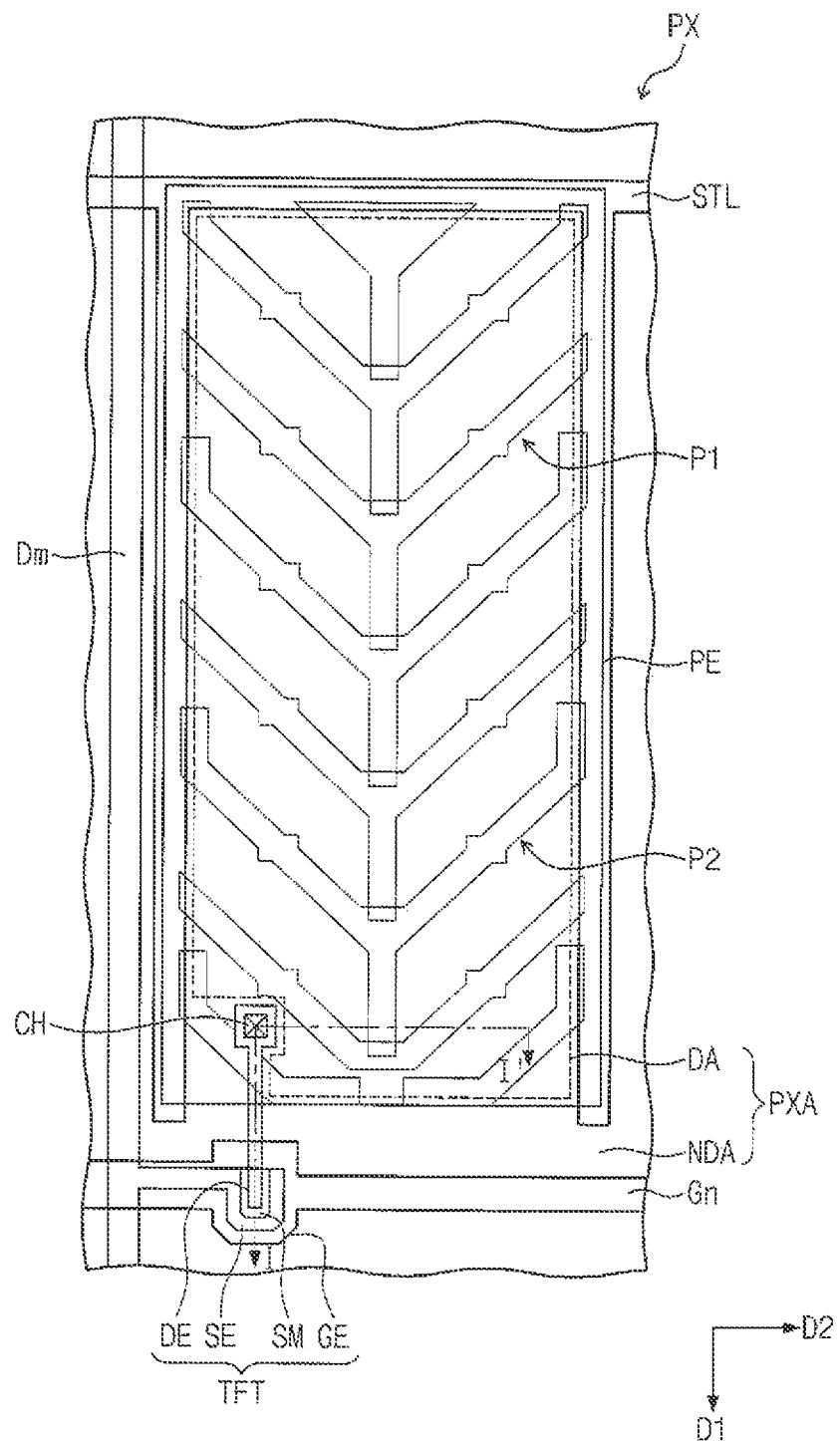
FIG. 2 is an enlarged plan view showing a pixel according to an exemplary embodiment of the present disclosure.
Figure 3:
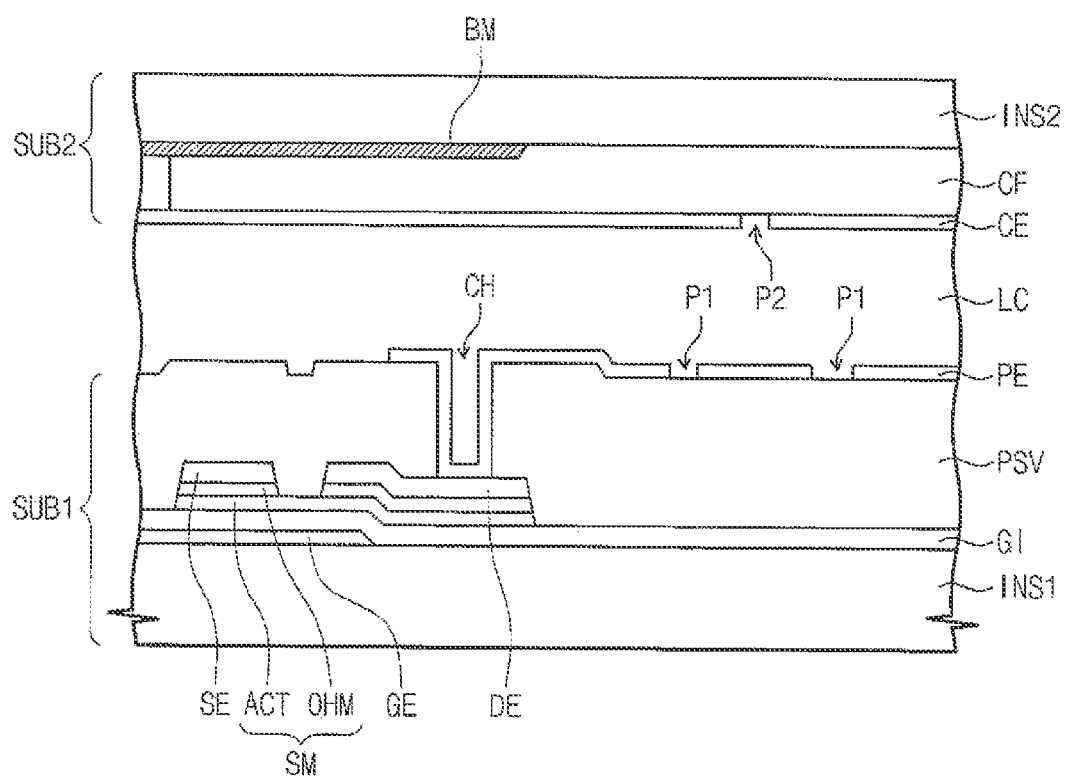
FIG. 3 is a cross-sectional view taken along a line I-I' of FIG. 2.

FIG. 2 is an enlarged plan view showing a pixel according to an exemplary embodiment of the present disclosure and FIG. 3 is a cross-sectional view taken along a line I-I' of FIG. 2.

In the present exemplary embodiment, the display panel 100 includes pixels to display the image. The display panel may be a liquid crystal display panel, an organic light emitting display panel, an electrophoretic display panel, an electrowetting display panel, or a microelectromechanical system display panel. Among them, the liquid crystal display panel will be described as the display panel 100. In this case, since the pixels have the same structure and function, only one pixel will be described in detail with the gate and data lines disposed adjacent thereto.

Referring to FIGS. 2 and 3, the liquid crystal display panel includes a first substrate SUB1 on which the pixels PX are arranged, a second substrate SUB2 facing the first substrate SUB1, and a liquid crystal layer LC interposed between the first substrate SUB1 and the second substrate SUB2.

Each pixel PX is disposed in a pixel area PXA including a display area DA and a non-display area NDA except for the display area DA. The image is displayed in the display area DA, but not displayed in the non-display area NDA.

In the present exemplary embodiment, the pixel PX has a length in the first direction D1 longer than that in the second direction D2, but it should not be limited thereto or thereby. That is, the length in the first direction D1 of the pixel PX may be substantially equal to the length in the second direction D2 of the pixel PX.

The first substrate SUB1 includes a first insulating substrate INS1, the plurality of gate lines G1 to Gn, a plurality of storage lines STL, and the plurality of data lines D1 to Dm, which are disposed on the first insulating substrate INS1.

The gate line Gn is disposed on the first insulating substrate INS1 and extends in the second direction D2.

The storage line STL is disposed to be spaced apart from the gate line Gn and extends in the second direction D2. The storage line STL may be formed together with the gate line Gn.

The data line Dm extends in the first direction D1 crossing the second direction D2. The data line Dm is disposed on the first insulating substrate INS1 on which the gate line Gn and the storage line STL are formed, and a gate insulating layer GI is disposed between the data line DM and the gate and storage lines Gn and STL.

Each pixel PX is connected to a corresponding gate line of the gate lines G1 to Gn and a corresponding data line of the data lines D1 to Dm. Each pixel PX includes a thin film transistor TFT and a pixel electrode PE connected to the thin film transistor TFT.

The thin film transistor TFT includes a gate electrode GE, a semiconductor layer SM, a source electrode SE, and a drain electrode DE and is disposed in the non-display area NDA.

The gate electrode GE is protruded from the gate line Gn.

The semiconductor layer SM is disposed on the gate electrode GE and the gate insulating layer GI is disposed between the semiconductor layer SM and the gate electrode GE. The semiconductor layer SM includes an active layer ACT disposed on the gate insulating layer GI and an ohmic contact layer OHM disposed on the active layer ACT. The active layer ACT is disposed at a position corresponding to areas in which the source and drain electrodes SE and DE are formed and an area disposed between the source electrode SE and the drain electrode DE. The ohmic contact layer OHM is disposed between the active layer ACT and the source electrode SE and between the active layer ACT and the drain electrode DE.

The source electrode SE is branched from the data line Dm and partially overlapped with the gate electrode GE when viewed in a plan view. The drain electrode DE is disposed to be spaced apart from the source electrode SE and partially overlapped with the gate electrode GE when viewed in a plan view.

The pixel electrode PE is connected to the drain electrode DE and a passivation layer PSV is disposed between the thin film transistor TFT and the pixel electrode PE. The passivation layer PSV is provided with a contact hole CH formed therethrough to expose a portion of the drain electrode DE, and the pixel electrode PE is connected to the drain electrode DE through the contact hole CH. The pixel electrode PE may be a transparent electrode.

The pixel electrode PE includes a first pattern P1. The first pattern P1 may be disposed not only in the display area DA but also in the area in which the gate line Gn and the data line Dm are disposed.

The second substrate SUB2 is disposed to face the first substrate SUB1 and includes a second insulating substrate INS2, a color filter CF, a black matrix BM, and a common electrode CE.

The color filter CF is disposed on the second substrate SUB2. The color filter CF ma be one of red, green, and blue color filters that respectively transmit red, green, and blue lights. The color filter CF is provided in a plural number and the color filters CF are disposed to respectively correspond to the pixels PX.

The black matrix BM blocks the light incident thereto. Accordingly, the image is not displayed in the area corresponding to the area in which the black matrix BM is disposed. In detail, the black matrix BM blocks the light traveling to the gate lines G1 to Gn, the data lines D1 to Dm, and the thin film transistors TFT from the backlight assembly BA. The black matrix BM is disposed to surround the pixel PX and has a lattice shape when viewed in a plan view, to thereby define the display area DA of the pixel PX. The black matrix BM is formed by patterning a chromium (Cr) thin layer, a chromium oxide ($CrxOy$) thin layer, or a black organic layer having the same transmittance as that of the chromium thin layer. Therefore, an aperture ratio of the pixel PX is determined depending on the non-display area NDA in which the thin film transistor TFT is formed. That is, as the non-display area NDA is decreased, the display area DA becomes wide, and thus the aperture ratio of the pixel PX is increased.

The common electrode CE may be a transparent electrode and include a second pattern P2 alternately arranged with the first pattern P1 in the display area DA. The second pattern P2 may be disposed not only in the display area DA but also in the areas in which the gate line Gn and the data line Dm are disposed.

The liquid crystal layer LC controls the light incident thereto through the first substrate SUB1. The liquid crystal layer LC includes liquid crystal molecules having a dielectric anisotropy. When the liquid crystal molecules have a negative dielectric anisotropy, a long axis of the liquid crystal molecules is aligned to be vertical to the electric field applied to the liquid crystal layer LC, but it should not be limited thereto or thereby. When the liquid crystal molecules have a positive dielectric anisotropy, a long axis of the liquid crystal molecules is aligned to be substantially in parallel to the electric field applied to the liquid crystal layer LC.

To align the liquid crystal molecules, alignment layers (not shown) are disposed on the first and second substrates SUB1 and SUB2 such that the liquid crystal molecules are disposed between the alignment layers. The alignment layers may be vertical alignment layers.

When the electric field is applied to between the first substrate SUB1 and the second substrate SUB2, the liquid crystal molecules are realigned in a specific direction between the first substrate SUB1 and the second substrate SUB2 to control the light. In other words, a polarization of the light incident to the liquid crystal layer LC is controlled by the realigned liquid crystal molecules.

Figure 4:
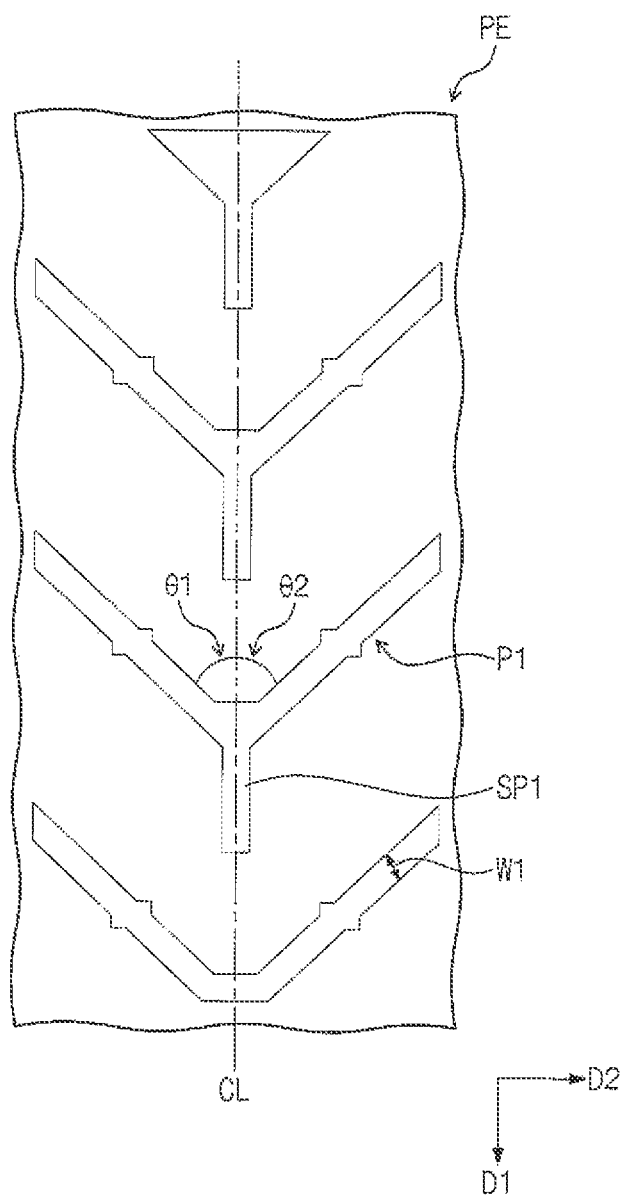
FIG. 4 is an enlarged plan view showing a pixel electrode in which a first pattern is formed.
Figure 5:
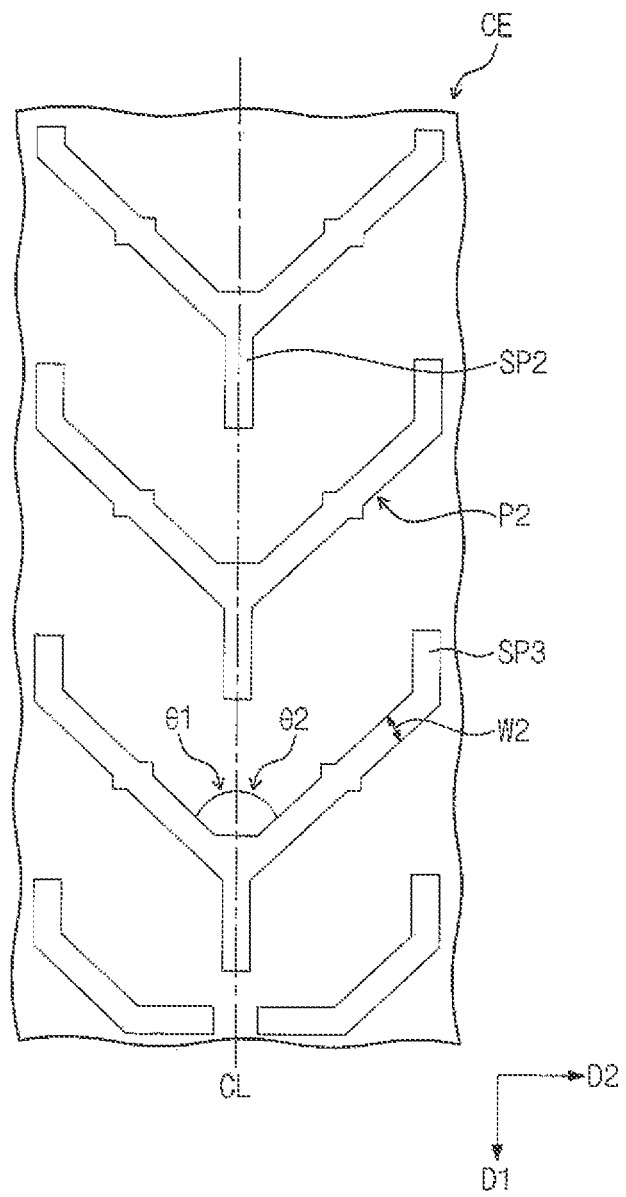
FIG. 5 is an enlarged plan view showing a common electrode in which a second pattern is formed.

FIG. 4 is an enlarged plan view showing a pixel electrode in which a first pattern is formed and FIG. 5 is an enlarged plan view showing a common electrode in which a second pattern is formed.

Hereinafter, the first pattern P1 and the second pattern P2 will be described in detail with reference to FIGS. 4 and 5.

Referring to FIG. 4, the first pattern P1 has a shape bent from a center line CL. The center line CL extends in the first direction D1 and passes through a center portion of the pixel area PXA. The first pattern P1 is inclined at first and second angles θ1 and θ2 with respect to the center line CL while extending. The first angle θ1 is in a range of about +35 degrees to about +45 degrees and the second angle θ2 is in a range of about −35 degrees to about −45 degrees.

The first pattern P1 may further include a first sub-pattern SP1 extending in the first direction D1 at the bent portion of the first pattern P1.

The first pattern P1 has a width W1 of about 8 micrometers to about 12 micrometers, but the width W1 of the first pattern P1 should not be limited thereto or thereby. That is, the first pattern P1 may be partially or wholly deformed, so that the first pattern P1 may have various widths different from the width W1.

In the present exemplary embodiment, the first pattern P1 may be a slit which is formed by partially removing the pixel electrode PE. But it should not be limited thereto or thereby. The first pattern P1 may be a profusion which is protruded from the pixel electrode PE in a sectional view.

Referring to FIG. 5, the second pattern P2 has a shape bent from the center line CL extending in the first direction D1 and passing through a center portion of the pixel area PXA. The second pattern P2 is inclined at first and second angles θ1 and θ2 with respect to the center line CL while extending. The first angle θ1 is in a range of about +35 degrees to about +45 degrees and the second angle θ2 is in a range of about −35 degrees to about −45 degrees.

The second pattern P2 may further include a second sub-pattern SP2 extending in the first direction D1 at the bent portion of the second pattern P2. In addition, the second pattern P2 may further include a third sub-pattern SP3 extending in an opposite direction to the first direction D1 in which the second sub-pattern SP2 extends. The third sub-pattern SP3 extends from both ends of the second pattern P2, which are spaced apart from the center line CL.

The second pattern P2 has a width W2 of about 8 micrometers to about 12 micrometers, but the width W2 of the second pattern P2 should not be limited thereto or thereby. That is the second pattern P2 may be partially or wholly deformed, so that the second pattern P2 may have various widths different from the width W2. In the present exemplary embodiment, the second pattern P2 may be a slit which is formed by partially removing the common electrode CE. But it should not be limited thereto or thereby. The second pattern P2 may be a protrusion which is protruded from the common electrode CE in a sectional view.

The first pattern P1 and the second pattern P2 are alternately arranged with each other when viewed in a plan view. The first sub-pattern SP1 is disposed adjacent to the bent portion of the second pattern P2 and the second sub-pattern SP2 is disposed adjacent to the bent portion of the first pattern P1.

As described above, when the first pattern P1 and the second pattern P2 are alternately arranged with each other, the display area DA is divided into a plurality of domains in which the alignment directions of the liquid crystal molecules are different from each other.

Figure 6:
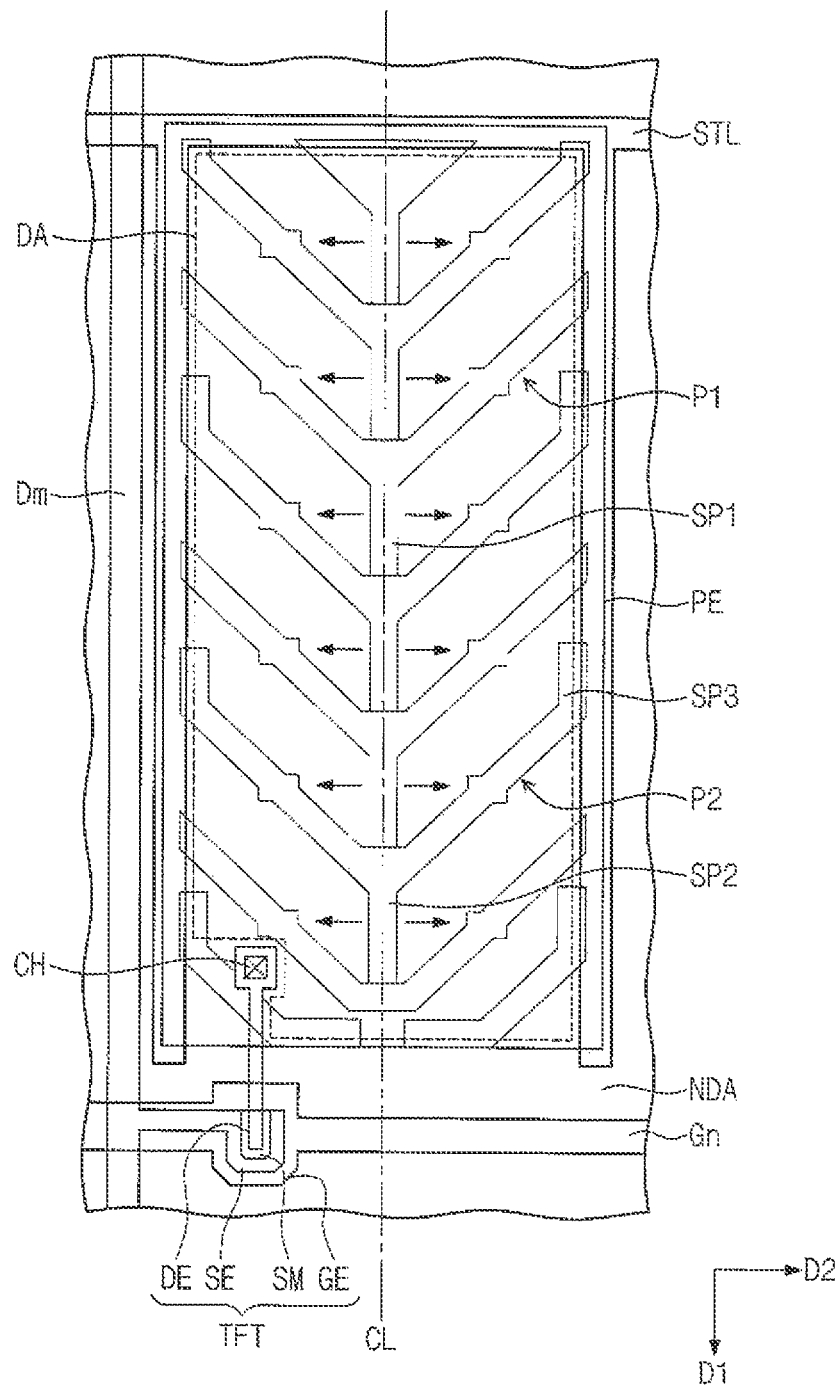
FIG. 6 is a plan view showing aliment directions of liquid crystal molecules when an electric field is generated between a pixel electrode and a common electrode according to an exemplary embodiment of the present disclosure.

FIG. 6 is a plan view showing the alignment directions of the liquid crystal molecules when the electric field is generated between the pixel electrode and the common electrode according to an exemplary embodiment of the present disclosure.

When the electric field is generated between the pixel electrode PE and the common electrode CE, the liquid crystal molecules are vertically aligned with respect to the first pattern P1 and the second pattern P2. Thus, the display area DA is divided into the domains with reference to the first and second patterns P1 and P2. The domains are left-right symmetrical with each other with respect to the center line CL.

As shown in FIG. 6, the liquid crystal molecules are aligned in the direction vertical (perpendicular) to the first sub-pattern SP1 and the second sub-pattern SP2. The liquid crystal molecules are vertically aligned in opposite directions to each other in the left and right portions of the first and second sub-patterns SP1 and SP2 with respect to the first and second sub-patterns SP1 and SP2. Accordingly, although a user watches the pixel from a side position, a gamma characteristic, i.e., visibility, of the pixel is improved since a gamma distortion is reduced.

Hereinafter, a difference in effect between the display apparatus according to the present exemplary embodiment and a conventional display apparatus will be described. The conventional display apparatus may be a micro-slit mode display apparatus or a super vertical alignment mode display apparatus.

To improve the visibility, different from the display apparatus according to the present exemplary embodiment, in which the patterns are formed in the pixel electrode and the common electrode to align the liquid crystal molecules in different directions, the conventional display apparatus includes micro-slits formed in the pixel electrode and provides a light-curing agent to the liquid crystal layer to align the liquid crystal molecules.

Figure 7:
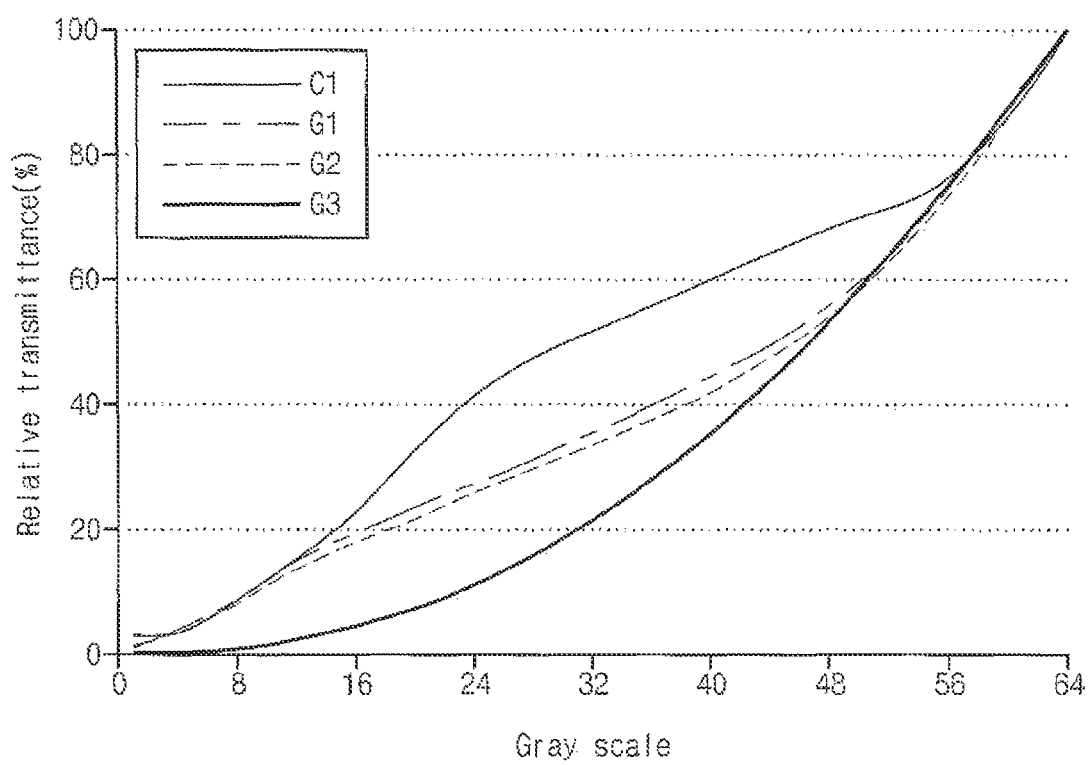
FIG. 7 is a graph showing a front gamma characteristic and side gamma characteristics of a display apparatus according to an exemplary embodiment of the present disclosure and side gamma characteristics of a conventional display apparatus.

FIG. 7 is a graph showing a front gamma characteristic and side gamma characteristics of a display apparatus according to an exemplary embodiment of the present disclosure and side gamma characteristics of a conventional display apparatus.

Referring to FIG. 7, a first graph G1 and a second graph G2 represent side gamma characteristics in the side portion of the display apparatus according to first and second exemplary embodiments. The first graph G1 represents the side gamma characteristics when the first angle θ1 is about +45 degrees and the second angle θ2 is about −45 degrees, and the second graph G2 represents the side gamma characteristics when the first angle θ1 is about +30 degrees and the second angle θ2 is about −30 degrees.

A graph C1 represents the side gamma characteristics of the conventional display apparatus.

A third graph G3 represents the front gamma characteristic of the display apparatus according to a third exemplary embodiment. The third graph G3 represents gamma values in which the gamma variations appearing on the pixel are most easily perceived by the user. That is, the third graph G3 represents a reference gamma curve. Therefore, as the gamma characteristic curie approximates to the third graph G3, the visibility becomes good.

A difference exists in the side gamma characteristics between the display apparatus according to the first and second exemplary embodiments and the conventional display apparatus.

Referring to FIG. 7 again, each of the first graph G1, the second graph G2, and the graph C1 has a similar deviation in relative transmittance (%) with respect to the third graph G3 in a low gray scale area, e.g., 24 gray-scale area or less. However, the deviation in relative transmittance (%) according to the graph C1 is more increased with respect to the third graph G3 than that of the first and second graphs G1 and G2 in an intermediate gray scale area, e.g., 32 gray-scale area or more.

As described above, since the side gamma characteristics of the display apparatus according to the first and second exemplary embodiments are approximate to the front gamma characteristic in the intermediate gray scale area more than that of the conventional display apparatus, the visibility of the display apparatus according to the first and second exemplary embodiments is much better than the visibility of the conventional display apparatus.

The display apparatus according to the present exemplary embodiment has the side gamma characteristics varying depending on the first angle θ1 and the second angle θ2.

As shown in FIG. 7, the second graph G2 is closer to the third graph G3 than the first graph G1. Thus, the visibility of the pixel when the first angle θ1 is about +30 degrees and the second angle θ2 is about −30 degrees is higher than the visibility of the pixel when the first angle θ1 is about +45 degrees and the second angle θ2 is about −45 degrees.

Figure 8:
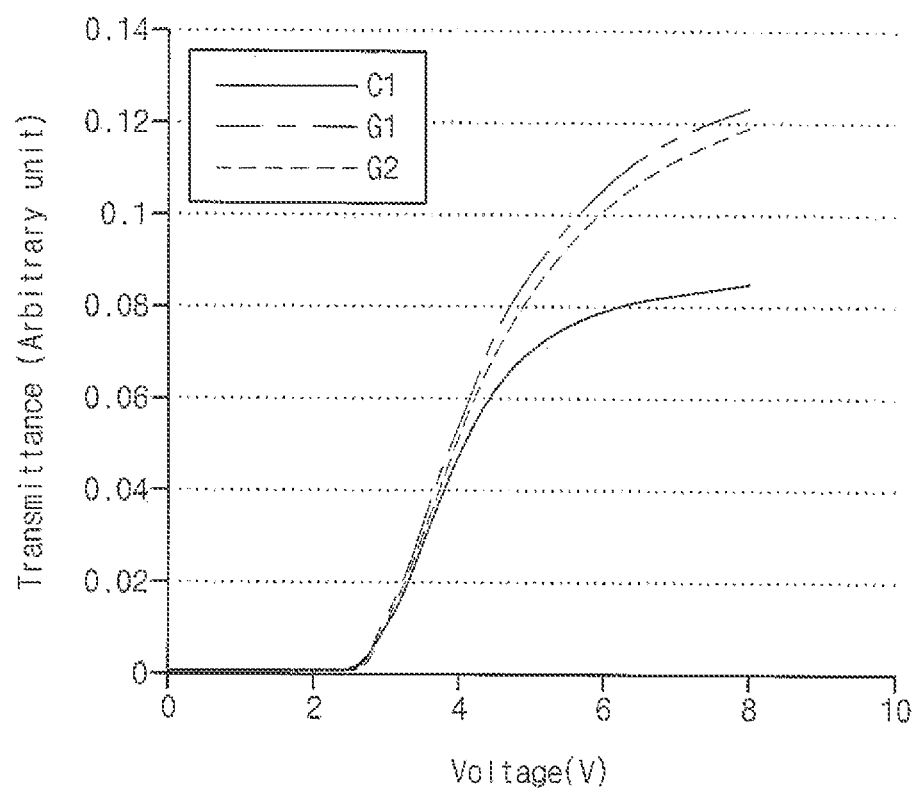
FIG. 8 is a graph showing a transmittance of a display apparatus according to an exemplary embodiment of the present disclosure and a transmittance of a conventional display apparatus.

FIG. 8 is a graph showing a transmittance of a display apparatus according to an exemplary embodiment of the present disclosure and a transmittance of a conventional display apparatus.

Referring to FIG. 8, first and second graphs G1 and G2 represent a transmittance of the display apparatus according to first and second exemplary embodiments of the present disclosure. The first graph G1 represents the transmittance when the first angle θ1 is about +45 degrees and the second angle θ2 is about −45 degrees. The second graph G2 represents the transmittance when the first angle θ1 is about −30 degrees and the second angle θ2 is about −30 degrees.

A graph C1 represents a transmittance of the conventional display apparatus.

As represented by the second graph G2, the transmittance of the display apparatus according to the second exemplary embodiment is reduced by about 5% compared with the transmittance of the display apparatus according to the first exemplary embodiment as represented by the first graph G1. However, the transmittance of the display apparatus according to the second exemplary embodiment is increased by about 40% to about 45% compared with the transmittance of the conventional display apparatus as represented by the graph C1.

Therefore, the transmittance of the display apparatus according to the present exemplary embodiment of the present disclosure becomes higher than that of the conventional display apparatus.

Figure 9:
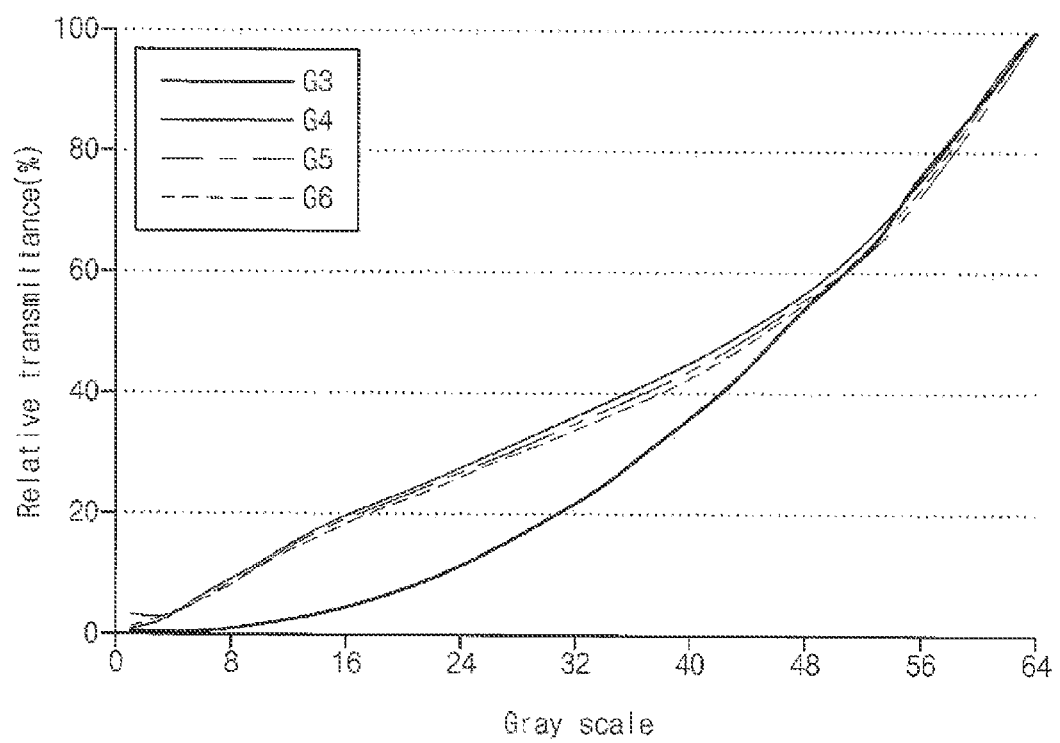
FIG. 9 is a graph showing a front gamma characteristic and side gamma characteristics of a display apparatus according to an exemplary embodiment of the present disclosure as a function of widths of first and second patterns.

FIG. 9 is a graph showing a front gamma characteristic and side gamma characteristics of a display apparatus according to an exemplary embodiment of the present disclosure as a function of widths of first and second patterns.

Referring to FIG. 9, a third graph G3 represents a front gamma characteristic of a display apparatus according to the third exemplary embodiment of the present disclosure. The third graph G3 represents gamma values in which the gamma variations appearing on the pixel are most easily perceived by the user. That is, the third graph G3 represents the reference gamma curve. Therefore, as the gamma characteristic curve approximates to the third graph G3, the visibility becomes good.

A fourth graph G4 represents the side gamma characteristic of each pixel when the pattern has the width of about 8 micrometers, a fifth graph G5 represents the side gamma characteristic of each pixel when the pattern has the width of about 10 micrometers, and a sixth graph G6 represents the side gamma characteristic of each pixel when the pattern has the width of about 12 micrometers.

The fifth graph G5 is disposed between the fourth graph G4 and the sixth graph G6 and the deviation in relative transmittance (%) between the third graph G3 and the sixth graph G6 is smaller when compared with the deviation in relative transmittance (%) between the third graph G3 and the fourth graph G4 and between the third graph G3 and the fifth graph G5. That is, the side gamma characteristic of the pixel becomes improved whenever the width of the pattern is increased by about 2 micrometers. This is because a gamma mixing effect caused by the increase in width of the pattern.

Figure 10:
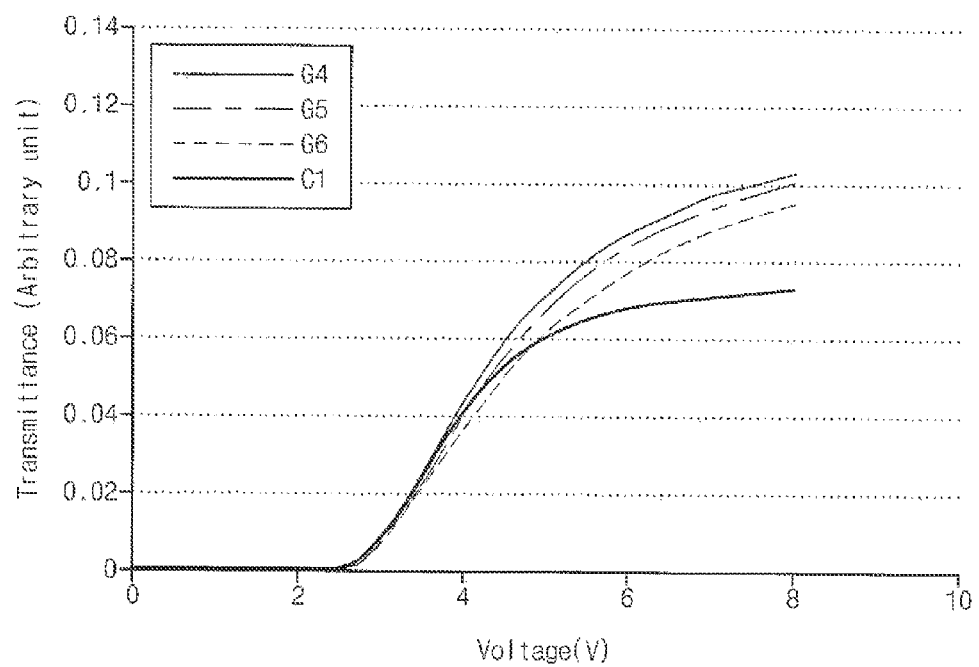
FIG. 10 is a graph showing a transmittance of a display apparatus according an exemplary embodiment of the present disclosure as a function of widths of first and second patterns and a transmittance of a conventional display apparatus.

FIG. 10 is a graph showing a transmittance of a display apparatus according an exemplary embodiment of the present disclosure as a function of widths of first and second patterns and a transmittance of a conventional display apparatus.

Referring to FIG. 10, the fourth, fifth, and sixth graphs G4, G5, and G6 represent the transmittance of the display apparatus according to the fourth, fifth, and sixth exemplary embodiments of the present disclosure.

The fourth graph G4 represents the transmittance of each pixel when the pattern has the width of about 8 micrometers, the fifth graph G5 represents the transmittance of each pixel when the pattern has the width of about 10 micrometers, and the sixth graph G6 represents the transmittance of each pixel when the pattern has the width of about 12 micrometers.

A graph C1 represents the transmittance of the conventional display apparatus.

The fifth graph G5 is disposed between the fourth graph G4 and the sixth graph G6 and the transmittance represented by the sixth graph G6 is lower than those represented by the fourth and fifth graphs G4 and G5. Consequently, when the width of the pattern is increased, the side gamma characteristic of the pixel becomes improved, but the transmittance of the pixel is decreased.

The transmittance of the conventional display apparatus represented by the graph C1 is lower than that represented by the sixth graph G6.

The transmittance of the display apparatus according to the fifth exemplary embodiment is increased by about 37% compared with the transmittance of the conventional display apparatus as represented by the fifth graph G5 and the graph C1.

Thus, the display apparatus according to the exemplary embodiments of the present disclosure may have improved visibility and transmittance.

Although the exempla embodiments have been described, it is understood that the present invention should not be limited to these exemplary embodiments but various changes and modifications can be made by one ordinary skilled in the art within the spirit and scope of the inventive concept as hereinafter claimed.

What is claimed is:
1. A display apparatus comprising:
a first substrate including a pixel area;
a second substrate facing the first substrate; and
a liquid crystal layer interposed between the first substrate and the second substrate,
wherein the first substrate comprises:
  a data line extending in a first direction;
  a gate line extending in a second direction crossing the first direction; and
  a pixel electrode including a first pattern comprising first to n parts of the first pattern in the first direction in order,
  wherein each of the second to n-th parts of the first pattern has a first bending pattern, and the second to n−1-th parts of the first pattern further has a first-first sub-pattern extending in the first direction at the bent portion of the first bending pattern, the first part of the first pattern has a triangle pattern and a second-first sub-pattern extending in the first direction at the triangle pattern, wherein the first bending pattern is inclined at first and second angles with respect to a center line extending in the first direction and passing through a center portion of the pixel area, the first pattern extending into an area in which the gate line and data line are disposed, wherein the first pattern has a width of about 8 micrometers to about 10 micrometers, wherein the second substrate comprises:

a common electrode including a second pattern comprising first to k parts of the second pattern in the first direction in order, wherein each of the first to k−1-th parts of the second pattern has a second bending pattern and a second sub-pattern extending in the first direction at the bent portion of the second bending pattern, and the k-th part of the second pattern has a first and second portions separated each other, wherein the second bending pattern is inclined at the first and second angles with respect to the center line, wherein the first angle is about +35 degrees to less than +45 degrees and the second angle is about −35 degrees to greater than −45 degrees, wherein the first to k parts of the second pattern are alternately arranged with the first to n parts of the first pattern, wherein the n-th part of the first pattern is disposed between the k-th part of the second pattern and the k−1-th part of the second pattern in a plan view, and wherein each of n and k is a positive integer.

2. The display apparatus of claim 1, wherein each of the first to k−1-th parts of the second pattern further comprises a first-third sub-pattern extending in an opposite direction to the second sub-pattern at both ends of the second bending pattern, and the both ends of the second bending pattern are spaced apart from the center line, and wherein each of the first and second portions of the k-th part of the second pattern includes a second-third sub-pattern extending in an extending direction of the second sub-pattern at end of each of the first and second portions.

3. The display apparatus of claim 2, wherein the second pattern has a width of about 8 micrometers to about 12 micrometers.

4. The display apparatus of claim 1, wherein the first and second patterns are openings respectively formed by partially removing the pixel electrode and the common electrode.

5. The display apparatus of claim 1, wherein the first pattern protrudes from the pixel electrode.

6. The display apparatus of claim 1, wherein the second pattern protrudes from the common electrode.

7. The display apparatus of claim 1, wherein the first substrate further comprises a thin film transistor connected to the data line, the gate line, and the pixel electrode.

8. The display apparatus of claim 1, wherein a length in the first direction of the pixel area is longer than a length in the second direction of the pixel area.

9. The display apparatus of claim 1, wherein each of the pixel electrode and the common electrode is a transparent electrode.

* * * * *